United States Patent
Wu et al.

(10) Patent No.: US 9,197,099 B2
(45) Date of Patent: Nov. 24, 2015

(54) POWER SUPPLY SYSTEM COMPRISING A FUEL CELL

(71) Applicant: CHUNG-HSIN ELECTRIC & MACHINERY MFG. CORPORATION, Taoyuan Hsien (TW)

(72) Inventors: Yi-Fan Wu, Taoyuan Hsien (TW); Ruiming Zhang, Taoyuan Hsien (TW); Chin-Hsien Cheng, Taoyuan Hsien (TW); Shuhai Quan, Wuhan (CN); Rui Quan, Wuhan (CN)

(73) Assignee: Chung-Hsin Electric & Machinery Mfg. Corp., Taoyuan Hsien (TW)

( * ) Notice: Subject to any disclaimer, the term of this patent is extended or adjusted under 35 U.S.C. 154(b) by 460 days.

(21) Appl. No.: 13/888,113

(22) Filed: May 6, 2013

(65) Prior Publication Data

US 2013/0293015 A1   Nov. 7, 2013

(30) Foreign Application Priority Data

May 7, 2012   (CN) ...................... 2012 2 0201579 U

(51) Int. Cl.
*H02J 9/00* (2006.01)
*H02J 9/06* (2006.01)
*H02J 1/00* (2006.01)

(52) U.S. Cl.
CPC ... *H02J 9/00* (2013.01); *H02J 9/06* (2013.01); *H02J 2001/004* (2013.01); *Y02B 90/14* (2013.01); *Y10T 307/615* (2015.04)

(58) Field of Classification Search
CPC ......... H02J 9/00; H02J 9/06; H02J 2001/004; Y10T 307/615; Y02B 90/14
See application file for complete search history.

(56) References Cited

U.S. PATENT DOCUMENTS

| 4,604,530 A * | 8/1986 | Shibuya | H02J 9/062 307/66 |
| 2008/0107941 A1 * | 5/2008 | Skidmore | H01M 8/04552 429/432 |

* cited by examiner

*Primary Examiner* — Rexford Barnie
*Assistant Examiner* — Terrence Willoughby

(57) ABSTRACT

A power supply system driving a load including a main power apparatus and a backup power apparatus is disclosed. The main power apparatus provides main power to the load according to city power. The backup power apparatus provides backup power to the load when the city power does not correspond to a first pre-determined condition and includes a recombination unit, a fuel cell unit, a transformation unit, and a control unit. The recombination unit recombines a methanol component to a hydrogen component. The fuel cell unit receives the hydrogen component to generate a first power. The transformation unit detects the city power and transforms the first power to generate the backup power. When the city power does not correspond to a first pre-determined condition, the control unit activates the reformer, the fuel cell unit, and the transformation unit to generate the backup power.

10 Claims, 14 Drawing Sheets

POWER SUPPLY SYSTEM COMPRISING A FUEL CELL

CROSS REFERENCE TO RELATED APPLICATIONS

This Application claims priority of China Patent Application No. 201220201579.4, filed on May 7, 2012, the entirety of which is incorporated by reference herein.

BACKGROUND OF THE INVENTION

1. Field of the Invention

The invention relates to a power supply system comprising fuel cell, and more particularly to a power supply system that is capable of driving a load when a city power is unstable.

2. Description of the Related Art

Generally, a conventional power supply system transforms a city power to a driving power and utilizes the driving power to drive a load. However, the conventional power supply system cannot normally drive the city power when the city power is unstable, such as a tripped breaker or a power failure. Thus, the load cannot operate normally. If the load is an important device, such as a base station or a fileserver, it is inconvenient to transmit information when the load cannot operate normally.

BRIEF SUMMARY OF THE INVENTION

In accordance with an embodiment, a power supply system for driving a load comprises a main power apparatus and a backup power apparatus. The main power apparatus generates main power according to city power and provides the main power to the load. The backup power apparatus provides backup power to the load when the city power does not correspond to a first pre-determined condition and comprises a recombination unit, a fuel cell unit, a transformation unit, and a control unit. The recombination unit is disposed in a case and comprises a reformer. The reformer combines a methanol component to generate a hydrogen component. The methanol component is disposed in a methanol tub and the hydrogen component is disposed in a hydrogen tub. The fuel cell unit comprises a supplying device and a cell stack. The supplying device generates a hydrogen input, a water input and an air input according to the hydrogen component, a water component and an air component, respectively. The cell stack generates a first power according to the hydrogen input, the water input, and the air input. The transformation unit detects the city power and transforms the first power to generate the backup power. The control unit activates the reformer, the supplying device, and the transformation unit to generate the backup power when the city power does not correspond to the first pre-determined condition. When the city power corresponds to the first pre-determined condition, the control unit controls the recombination unit to make the hydrogen component disposed in the hydrogen tub correspond to the hydrogen condition.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
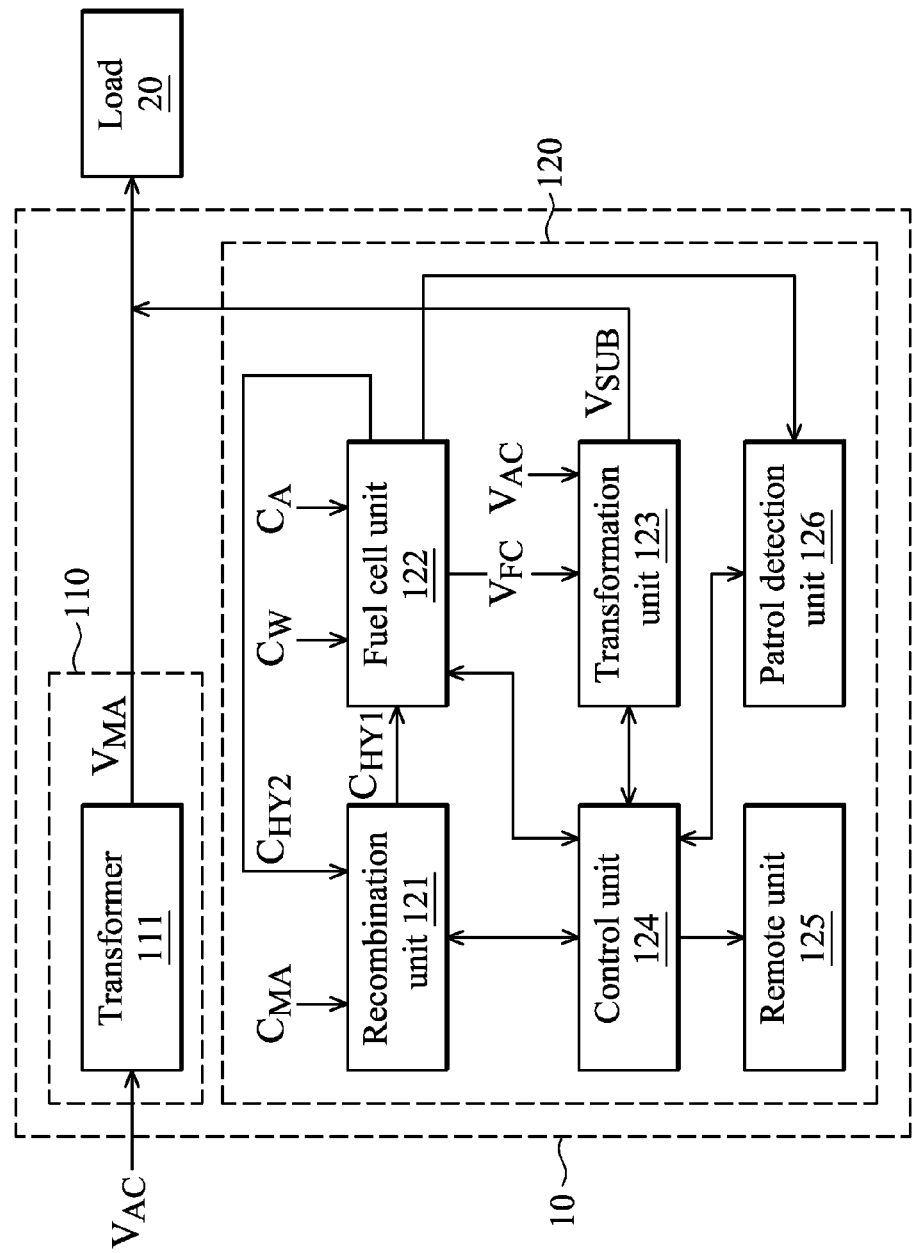
FIG. 1 is a schematic diagram of an exemplary embodiment of a power supply system.

FIG. 1 is a schematic diagram of an exemplary embodiment of a power supply system. The power supply system 10 drives a load 20 according to city power $V_{AC}$. In this embodiment, when the city power $V_{AC}$ is unstable, the power supply system 10 is capable of driving the load 20 continuously. The invention does not limit the type of the load 20. Any device can serve as the load 20, as long as the device needs power.

The power supply system 10 comprises a main power apparatus 110 and a backup power apparatus 120. The main power apparatus 110 provides main power $V_{MA}$ to the load according to the city power $V_{AC}$. The invention does not limit the circuit structure of the main power apparatus 110. Any device can serve as the main power apparatus 110, as long as the device is capable of transforming the city power $V_{AC}$ to drive the load 20. In this embodiment, the main power apparatus 110 comprises a transformer 111. The transformer 111 transforms the city power $V_{AC}$ to the main power $V_{MA}$. Additionally, the invention does not limit the type of the main power $V_{MA}$. In some embodiments, the main power $V_{MA}$ is a DC type or an AC type.

The backup power apparatus 120 provides a backup power $V_{SUB}$ to the load 20. When the city power $V_{AC}$ does not correspond to a first pre-determined condition, it represents the city power $V_{AC}$ is unstable, such as a tripped breaker or a power failure. Thus, the backup power apparatus 120 provides the backup power $V_{SUB}$ to the load 20 to maintain the operation of the load 20. In this embodiment, the backup power apparatus 120 utilizes a fuel cell to generate the backup power $V_{SUB}$.

In other embodiments, when the city power $V_{AC}$ corresponds to the first pre-determined condition, it represents the city power $V_{AC}$ is stable. Thus, the backup power apparatus 120 operates in different modes, such as standby mode, a pre-turning on mode, a turning on mode, an operation mode, and a turning off mode. The backup power apparatus 120 operates in these different modes as discussed in more detail below.

As shown in FIG. 1, the backup power apparatus 120 comprises a recombination unit 121, a fuel cell unit 122, a transformation unit 123, and a control unit 124, but the disclosure is not limited thereto. Any circuit structure can serve as the backup power apparatus 12, as long as the circuit structure is capable of generating backup power according to the power generated by a fuel cell.

The recombination unit 121 recombines a methanol component $C_{MA}$ to generate a hydrogen component $C_{HY1}$. The fuel cell unit 122 generates power $V_{FC}$ according to the hydrogen component $C_{HY1}$, a water component $C_W$, and an air component $C_A$. The transformation unit 123 transforms the power $V_{FC}$ to generate the backup power $V_{SUB}$. The control unit 124 controls the operations of the recombination unit 121, the fuel cell unit 122, and the transformation unit 123 to generate the backup power $V_{SUB}$ to the load 20 when the city power $V_{AC}$ is unstable.

The backup power apparatus 120 further comprises a remote unit 125 and a patrol detection unit 126. The remote unit 125 transmits the operational status for each of the recombination unit 121, the fuel cell unit 122, and the transformation unit 123 to a remote terminal via the Internet such that a remote user may immediately obtain the operational status of the backup power apparatus 120. In this embodiment, the control unit 124 notifies the remote user of the operational status of the recombination unit 121, the fuel cell unit 122, and the transformation unit 123 via the remote unit 125.

In one embodiment, the fuel cell unit 122 intermittently eliminates a hydrogen component $C_{HY2}$ to eliminate mist and impurity accumulated in the fuel cell unit 122. The eliminated hydrogen component $C_{HY2}$ is led into a reformer of the recombination unit 121 to be recombined. Thus, the utility rate of the hydrogen and efficiency of the backup power apparatus 120 are increased. The patrol detection unit 126 monitors the voltage of each cell in the fuel cell unit 122. When the voltage of one cell is abnormal, the patrol detection unit 126 notifies the control unit 124 of the abnormal voltage. The control unit 124 adjusts the operation of the fuel cell unit 122 according to the information provided by the patrol detection unit 126. In one embodiment, the control unit 124 transmits the information to the remote terminal via the remote unit 125. In other embodiments, the patrol detection unit 126 is integrated into the control unit 124.

Figure 2:
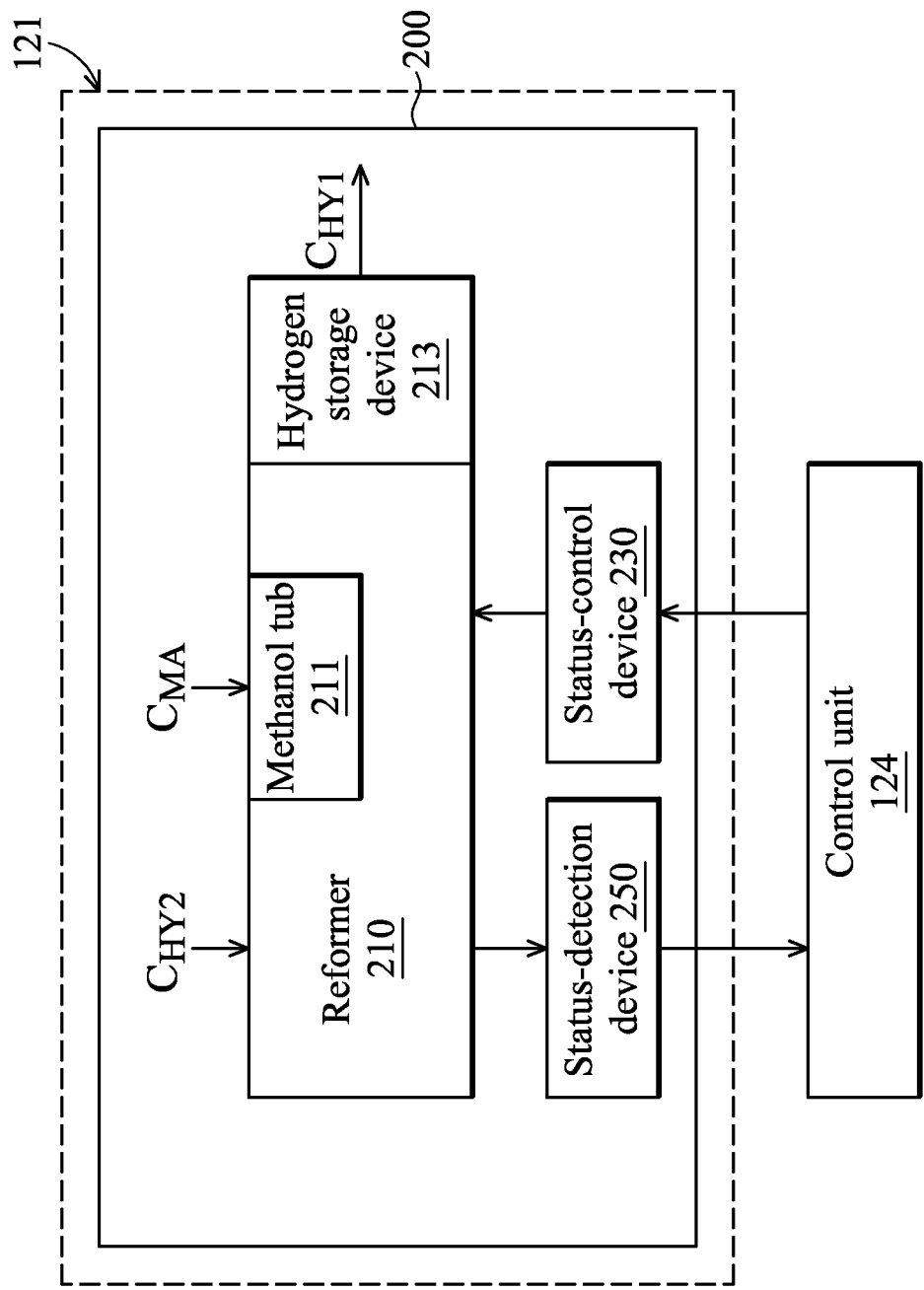
FIG. 2 is a schematic diagram of an exemplary embodiment of a recombination unit.

FIG. 2 is a schematic diagram of an exemplary embodiment of a recombination unit. In one embodiment, the recombination unit 121 is disposed in a case 200 to execute a recombination action. In this embodiment, the recombination unit 121 comprises a reformer 210, a status-control device 230, and a status-detection device 250.

The reformer 210 recombines the methanol component $C_{MA}$ to generate the hydrogen component $C_{HY1}$. The invention does not limit the circuit structure of the recombination unit 210. Any circuit structure can serve as the recombination unit 210, as long as the circuit structure is capable of recombining a hydrogen component. In one embodiment, the reformer 210 comprises a pump, a methanol pump, an electromagnetic valve, a heat converter, an ignition unit, a burner, a reactor, a passivation module, and so forth. For brevity, FIG. 2 only shows a methanol tub 211 and a hydrogen storage device 213 of the reformer 210. The methanol tub 211 stores the methanol component $C_{MA}$. The hydrogen storage device 213 stores the hydrogen component $C_{HY1}$.

The status-control device 230 controls the recombination status of the reformer 210 such that the reformer 210 is capable of recombining the methanol component $C_{MA}$ normally. In one embodiment, the status-control device 230 controls an electric heater to control the temperature of the case 200 such that the reformer 210 operates in an appropriate temperature. The invention does not limit the position of the electric heater. In one embodiment, the electric heater is disposed in the reactor or the passivation module of the reformer 210.

In another embodiment, the status-control device 230 controls the speed of a fan disposed in the case 200 to avoid the concentration of hydrogen in the case 200 from becoming too high. For example, when the fan operates, air can stably and quantitatively be introduced into the case 200 to avoid the concentration of hydrogen in the case 200 from getting too high.

In another embodiment, when the reformer 210 does not operate, the status-control device 230 leads a reductant (e.g. hydrogen) into the reformer 210 to avoid oxidation of the metal of the reformer 210 and the subsequent reduction in the performance of the reformer 210.

The status-detection device 250 detects a recombination status and an operational status of the reformer 210. In one embodiment, the recombination status of the reformer 210 comprises at least one value from among the operational status of the fan in the case 200, the hydrogen concentration status of the case 200, and the temperature in the case 200. Additionally, the operational status relates to at least one value from among the temperature of the case 200, the amount of the methanol component $C_{MA}$ disposed in the methanol tub 211, and the amount of the hydrogen component $C_{HY1}$ disposed in the hydrogen storage device 213.

The status-detection device 250 provides the detection result (i.e. the recombination status and the operational status of the reformer 210) to the control unit 124. The control unit 124 controls the status-control device 230 to adjust the recombination status of the reformer 210 according to the detection result.

For example, when the fan in the case 200 does not operate, or the speed of the fan is too low, the concentration of the hydrogen in the case 200 becomes too high. The status-detection device 250 detects the speed of the fan and provides the detection result to the control unit 124. The control unit 124 adjusts the speed of the fan via the status-control device 230 to avoid damage caused by an accumulation of hydrogen.

The invention does not limit the structure of the status-detection device 250. Any structure can serve as the status-detection device 250, as long as the structure is capable of detecting the operation of the reformer 210. In one embodiment, the status-detection device 250 comprises a thermograph, a manometer, and a liquidometer.

In addition, the status-detection device 250 detects the operational status of the reformer 210, including such values as the temperature of the case 200, the amount of the methanol component $C_{MA}$ disposed in the methanol tub 211, and/or the pressure of the pump disposed in the reformer 210. The control unit 124 determines whether the operation of the reformer 210 corresponds to an operational status according to the detection result of the status-detection device 250. When the operation of the reformer 210 does not correspond to the operational status, the control unit 124 adjusts the reformer 210 via the status-control device 230 such that the operation of the reformer 210 is maintained at an optimum status. When the operation of the reformer 210 corresponds to the operational status, the control unit 124 provisionally turns off the reformer 210.

Figure 3:
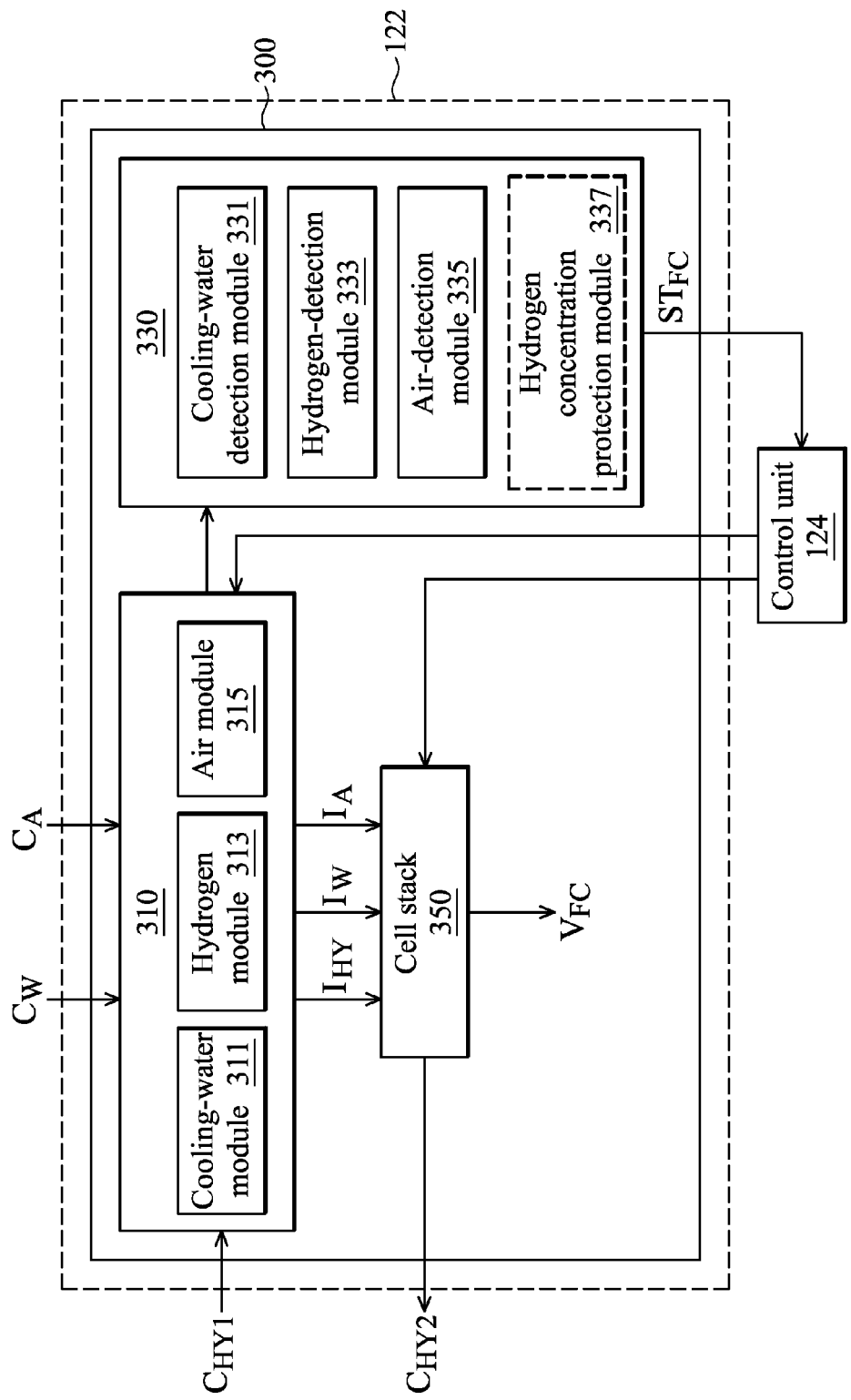
FIG. 3 is a schematic diagram of an exemplary embodiment of a fuel cell unit.

FIG. 3 is a schematic diagram of an exemplary embodiment of a fuel cell unit. The invention does not limit the circuit structure of the fuel cell unit 122. Any circuit structure can serve as the fuel cell unit 122, as long as the circuit structure is capable of generating power according to a hydrogen component, a water component, and an air component. In this embodiment, the fuel cell unit 122 is disposed in a case 300. The fuel cell unit 122 comprises a supplying device 310, a supply detection device 330 and a cell stack 350.

The supplying device 310 generates a hydrogen input $I_{HY}$, a water input $I_W$ and an air input $I_A$ according to the hydrogen component $C_{HY1}$, the water component $C_W$ and the air component $C_A$. In this embodiment, the supplying device 310 comprises a cooling-water detection module 331, a hydrogen-detection module 333, and an air-detection module 335.

The cooling-water detection module 331 detects the water input $I_W$ to obtain the operational status of the cooling-water module 311. The invention does not limit the internal structure of the cooling-water detection module 331. Any structure can serve as the cooling-water detection module 331, as long as the structure is capable of detecting the operation of the cooling-water module. In one embodiment, the cooling-water detection module 331 comprises a temperature detector and a pressure detector.

The hydrogen-detection module 333 detects the hydrogen input $I_{HY}$ to obtain the operational status of the hydrogen module 313. The invention does not limit the internal structure of the hydrogen-detection module 333. Any structure can serve as the hydrogen-detection module 333, as long as the structure is capable of detecting the operation of the hydrogen module 313. In one embodiment, the hydrogen-detection module 333 comprises a pressure detector.

The air-detection module 335 detects the air input $I_A$ to obtain the operational status of the air module 315. The invention does not limit the internal structure of the air-detection module 335. Any structure can serve as the air-detection module 335, as long as the structure is capable of detecting the operation of the air module 315. In one embodiment, the air-detection module 335 comprises a pressure detector.

In other embodiments, the supply detection device 330 further comprises a hydrogen concentration protection module 337 to avoid the concentration of the hydrogen in the case 300 from rising too high. In one embodiment, the hydrogen concentration protection module 337 is a fan.

The control unit 124 controls the supplying device 310 to adjust the hydrogen input $I_{HY}$, the water input $I_W$, and the air input $I_A$ according to the fuel status $ST_{FC}$ such that the cell stack operates at an optimum status. In this embodiment, the cell stack 350 generates the power $V_{FC}$ according to the hydrogen input $I_{HY}$, the water input $I_W$, and the air input $I_A$.

Since the hydrogen input $I_{HY}$ comprises minute amounts of water and impurities, when the cell stack 350 generates the power $V_{FC}$, the water and impurities are also generated and remain in the cell stack 350. Thus, the control unit 124 controls a hydrogen output line (not shown) in the cell stack 350 to eliminate the hydrogen such that the water and impurities are also eliminated.

Figure 4:
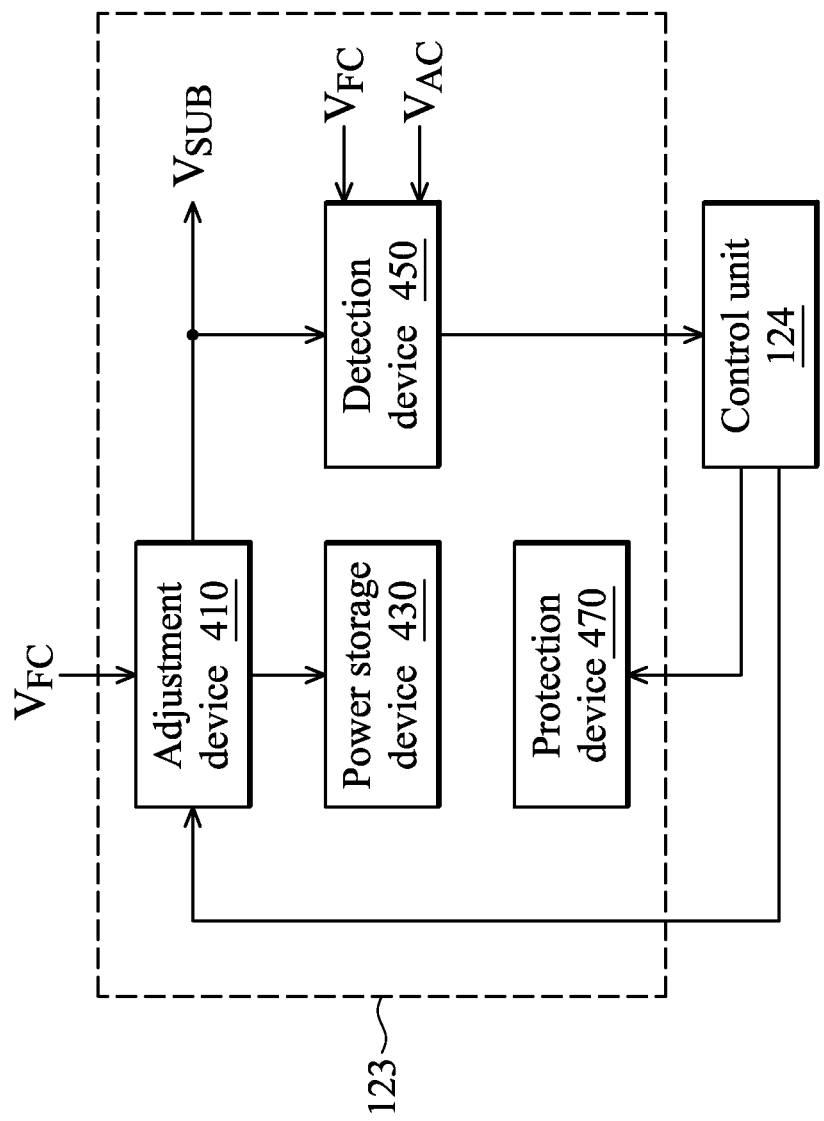
FIG. 4 is a schematic diagram of an exemplary embodiment of a transformation unit.

FIG. 4 is a schematic diagram of an exemplary embodiment of a transformation unit. In this embodiment, the transformation unit 123 detects the city power $V_{AC}$ and transforms the power $V_{FC}$ to generate the backup power $V_{SUB}$. The invention does not limit the circuit structure of the transformation unit 123. Any circuit structure can serve as the transformation unit 123, as long as the circuit structure is capable of transforming the power generated by a fuel cell unit. As shown in FIG. 4, the transformation unit 123 comprises an adjustment device 410, a power storage device 430, a detection device 450, and a protection device 470.

The adjustment device 410 transforms the power $V_{FC}$ generated by the fuel cell unit 122 to a stable backup power $V_{SUB}$ and adjusts the output current according to a real requirement. For example, when the load 20 requires a large amount of energy, the adjustment device 410 collects energy from the fuel cell unit 122 or from the power storage device 430. Alternatively, when the load 20 requires a small amount of energy, the adjustment device 410 stores unnecessary energy in the power storage device 430.

Furthermore, when the city power $V_{AC}$ is unstable (i.e., the city power $V_{AC}$ does not correspond to a first pre-determined condition), before the fuel cell unit 122 is activated, the power storage device 430 provides energy to other elements. In one embodiment, the power storage device 430 is a rechargeable battery or a capacitor.

The detection device 450 detects the output voltage (i.e. the power $V_{FC}$) and the output current of the fuel cell unit 122 and detects the output voltage (i.e. the backup power $V_{SUB}$) and the output current of the adjustment device 410. In another embodiment, the detection device 450 also detects the changes in the current of the load 20 to adjust the backup power $V_{SUB}$. Additionally, the detection device 450 also detects the city power $V_{AC}$ to determine whether the city power $V_{AC}$ is unstable.

The control unit 124 controls the adjustment device 410 and the protection device 470 according to the detection result of the detection device 450. For example, when the fuel cell unit 122 is not ready, the control unit 124 activates the protection device 470 such that the fuel cell unit 122 soon operates in a stable status. In one embodiment, the protection device 470 comprises a relay, an over-current protection element, and a discharging resistor.

Figure 5:
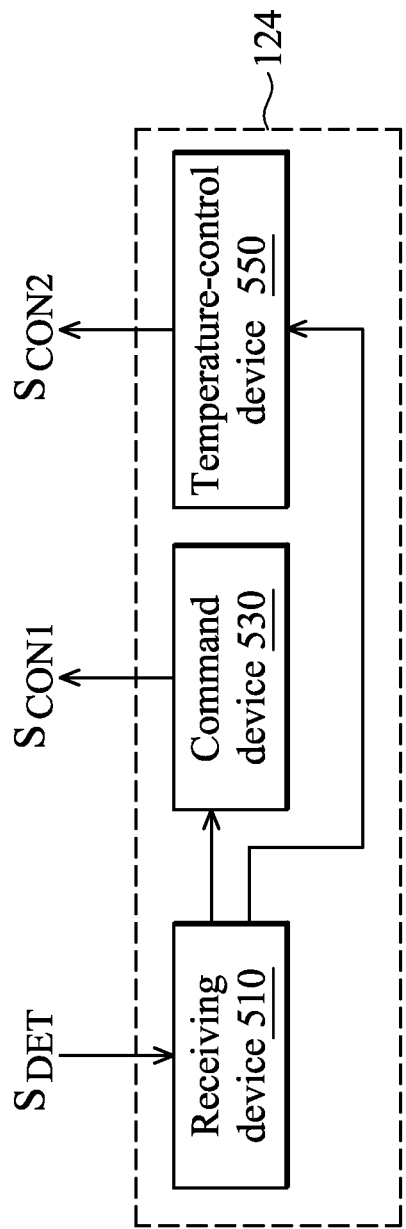
FIG. 5 is a schematic diagram of an exemplary embodiment of a control unit.

FIG. 5 is a schematic diagram of an exemplary embodiment of a control unit. In this embodiment, the control unit 124 generates control information $S_{CON1}$ according to detection information $S_{DET}$. The invention does not limit the source of the detection information $S_{DET}$. In one embodiment, the detection information $S_{DET}$ is the recombination status or the operational status generated by the status-detection device 250 of the recombination unit 121. In other embodiments, the detection information $S_{DET}$ is the fuel status generated by the supply detection device 330 of the fuel cell unit 122 or the detection result output from the detection device 450 of the transformation unit 123.

In this embodiment, the control unit 124 comprises a receiving device 510, a command device 530, and a temperature-control device 550. The receiving device 510 receives the different detection information $S_{DET}$ provided by the different units and transforms all of the detection information $S_{DET}$ to an appropriate value according to the specification of a corresponding element. In one embodiment, the receiving device 510 comprises a plurality of receivers to receive the detection results generated by the different units. In another embodiment, the receiving device 510 sequentially receives the detection results generated by the different units.

The command device 530 and the temperature-control device 550 generate the control data $S_{CON1}$ and $S_{CON2}$ to the corresponding unit to turn off or adjust the operation of the corresponding unit according to the received detection results. For example, when the detection information $S_{DET}$ received by the receiving device 510 comprises the recombination status and the operational status generated by the status-detection device 250 of the recombination unit 121, the command device 530 generates control data to the recombination unit 121 according to the detection information $S_{DET}$ such that the recombination unit 121 operates at an optimum status.

Similarly, when the detection information $S_{DET}$ received by the receiving device 510 is the fuel status $ST_{FC}$ generated by the status-detection device 330 of the fuel cell unit 122 or is the detection result generated by the detection device 450 of the transformation unit 123, the command device 530 generates corresponding control data to the fuel cell unit 122 or to the transformation unit 123 according to the detection information $S_{DET}$ such that the fuel cell unit 122 or the transformation unit 123 operates at an optimum status.

Furthermore, the temperature-control device 550 provides the control data $S_{CON2}$ to control the temperature of the case 300 according to the detection information $S_{DET}$ such that the fuel cell unit 122 operates at an optimum temperature. In another embodiment, the command device 530 generates the control data $S_{CON1}$ to the remote unit 125 or the patrol detection unit 126 according to the detection information $S_{DET}$.

In this embodiment, when the backup power apparatus 120 operates in a standby mode, a pre-turning on mode or an operation mode, the recombination unit 121 is required to generate enough of the hydrogen component $C_{HY1}$ for the transformation unit 123 to generates the backup power $V_{SUB}$ according to the power $V_{FC}$ generated by the fuel cell unit 122. Thus, while in standby mode, the pre-turning on mode or the operation mode, the control unit 124 executes a recombination confirmed action to determine whether the recombination unit 121 is ready.

Figure 6:
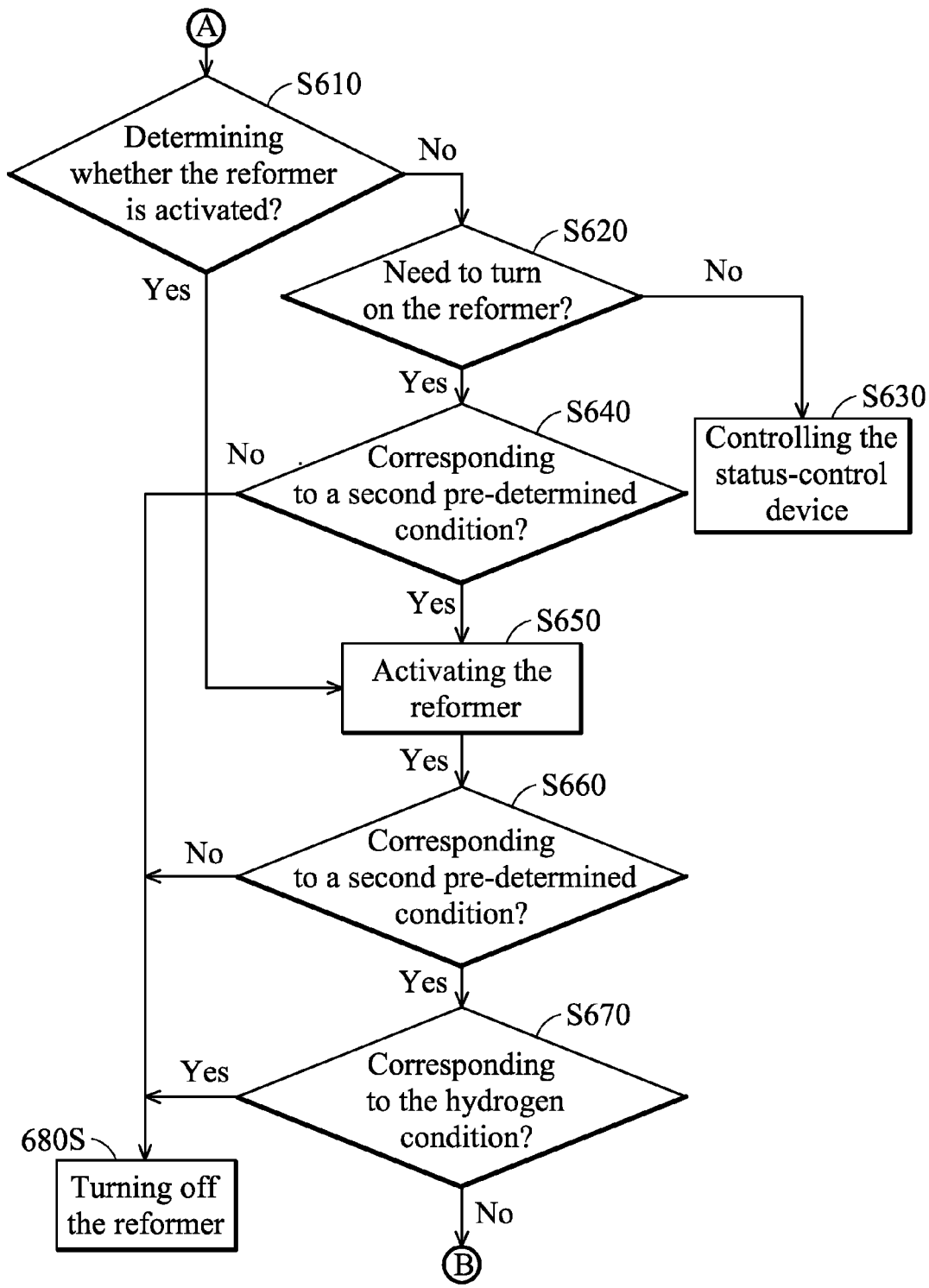
FIG. 6 is a schematic diagram of an exemplary embodiment of the recombination confirmed action.

FIG. 6 is a schematic diagram of an exemplary embodiment of the recombination confirmed action. First, the control unit 124 determines whether the reformer 210 is activated (step S610). When the reformer 210 is activated, the control unit 124 determines whether to turn off the reformer 210 according to the operational status generated by the status-detection device 250 (step S660). In one embodiment, the operational status generated by the status-detection device 250 relates to at least one value from among the temperature of the case 200, the amount of the methanol component disposed in the methanol tub 211, and the amount of the hydrogen component disposed in the hydrogen storage device 213.

When the operational status does not correspond to a second pre-determined condition, it represents the temperature of the case 200 being too high or too low, the amount of the methanol component disposed in the methanol tub 211 not being enough, or the amount of the hydrogen component disposed in the hydrogen storage device 213 not being enough. The control unit 124 turns off the reformer 210 (step S680). When the operational status corresponds to the second pre-determined condition, the control unit 124 determines whether the amount of the hydrogen component disposed in the hydrogen storage device 213 corresponds to a hydrogen condition (step S670). In one embodiment, the hydrogen condition in step S670 is a maximum hydrogen storage amount.

When the amount of the hydrogen component disposed in the hydrogen storage device 213 corresponds to the hydrogen condition, it represents the amount of the hydrogen component disposed in the hydrogen storage device 213 being sufficient, and thus the control unit 124 turns off the reformer 210 (step S680). However, when the reformer 210 is not activated, the control unit 124 determines whether to turn on the reformer 210 (step S620). In one embodiment, the control unit 124 determines whether to turn on the reformer 210 according to the amount of the hydrogen component disposed in the hydrogen storage device 213.

When the amount of the hydrogen component disposed in the hydrogen storage device 213 corresponds to a hydrogen condition, it means that the reformer 210 does not require being activated. Thus, the control unit 124 controls the status-control device 230 according to the recombination status (e.g. the operation of a fan in the case 200, the status of the hydrogen concentration in the case 200, or the temperature of the case 200) generated by the status-detection device 250 of the recombination unit 121 (step S630). When the amount of the hydrogen component disposed in the hydrogen storage device 213 does not correspond to the hydrogen condition, it represents that the reformer 210 needs to be activated. Thus, the control unit 124 determines whether to turn on the reformer 210 according to the operational status generated by the status-detection device 250 of the recombination unit 121 (step S640).

When the operational status does not correspond to the second pre-determined condition, the control unit 124 turns off the reformer 210 (step S680). When the operational status corresponds to the second pre-determined condition, the control unit 124 activates the reformer 210 to execute a recombination action (step S650) and determines whether the operational status generated by the status-detection device 250 of the recombination unit 121 still corresponds to the second pre-determined condition (step S660). When the operational status does not correspond to the second pre-determined condition, the control unit 124 turns off the reformer 210 (step S680). When the operational status corresponds to the second pre-determined condition, the control unit 124 determines whether the amount of the hydrogen component disposed in the hydrogen storage device 213 corresponds to the hydrogen condition (step S670). When the amount of the hydrogen component disposed in the hydrogen storage device 213 corresponds to the hydrogen condition, the control unit 124 turns off the reformer 210 (step S680).

Figure 7:
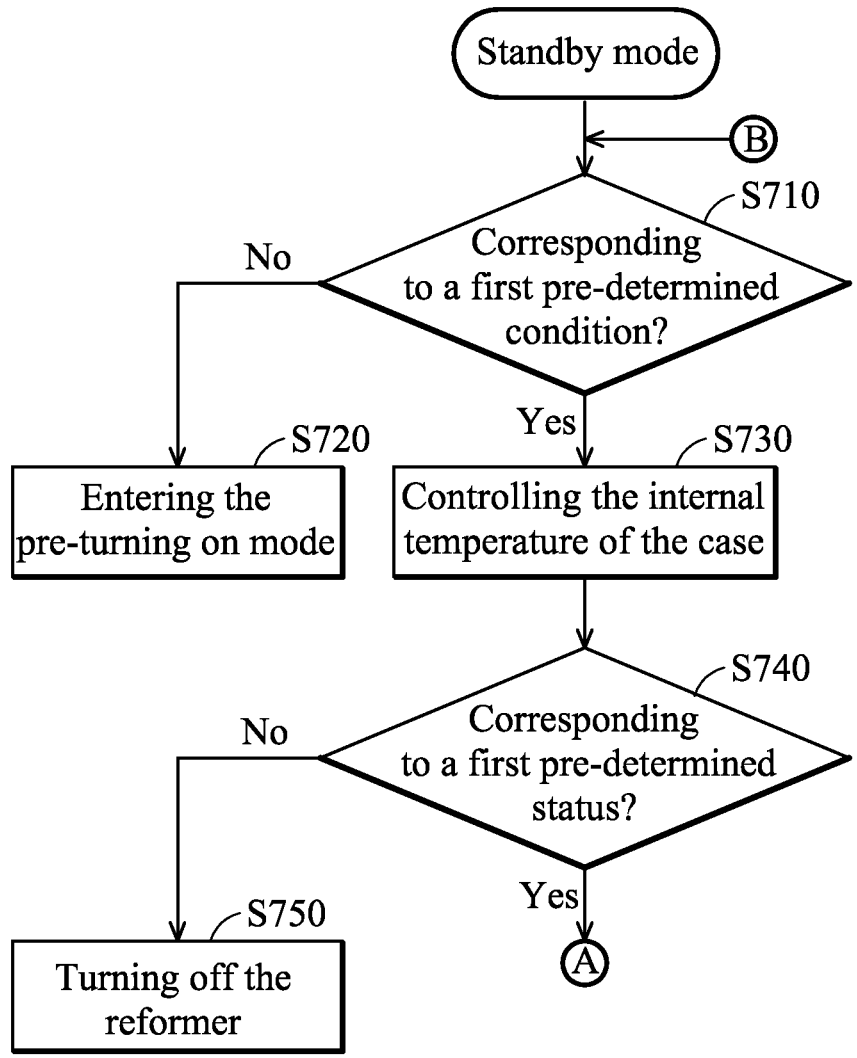
FIG. 7 is a schematic diagram of an exemplary embodiment of the backup power apparatus operating in a standby mode.

FIG. 7 is a schematic diagram of an exemplary embodiment of the backup power apparatus operating in a standby mode. The control unit 124 determines whether the city power $V_{AC}$ corresponds to a first pre-determined condition according to the detection result generated by the supply detection device 330 of the transformation unit 123 (step S710). When the city power $V_{AC}$ does not correspond to a first pre-determined condition, it represents that the city power $V_{AC}$ is unstable. Thus, the backup power apparatus 120 enters the pre-turning on mode (step S720). When the city power $V_{AC}$ corresponds to the first pre-determined condition, the control unit 124 controls the internal temperature of the case 200 or 300 (step S730). In other embodiments, the control unit 124 controls the internal temperature of a specific case comprising the backup power apparatus 120.

The control unit 124 determines whether the recombination status generated by the status-detection device 250 corresponds to a first pre-determined status (step S740). In one embodiment, the recombination status generated by the status-detection device 250 is the operational status of a fan in the case 200, the hydrogen concentration in the case 200 or the temperature of the case 200. When the recombination status does not correspond to the first pre-determined status, the control unit 124 turns off the reformer (step S750). When the recombination status corresponds to the first pre-determined status, the control unit 124 executes the recombination confirmed action shown in FIG. 6 to confirm whether the recombination unit 121 is ready.

When the backup power apparatus 120 operates in the standby mode and step S670 determines that the amount of the hydrogen component disposed in the hydrogen storage device 213 does not correspond to the hydrogen condition, step S710 is executed.

Figure 8:
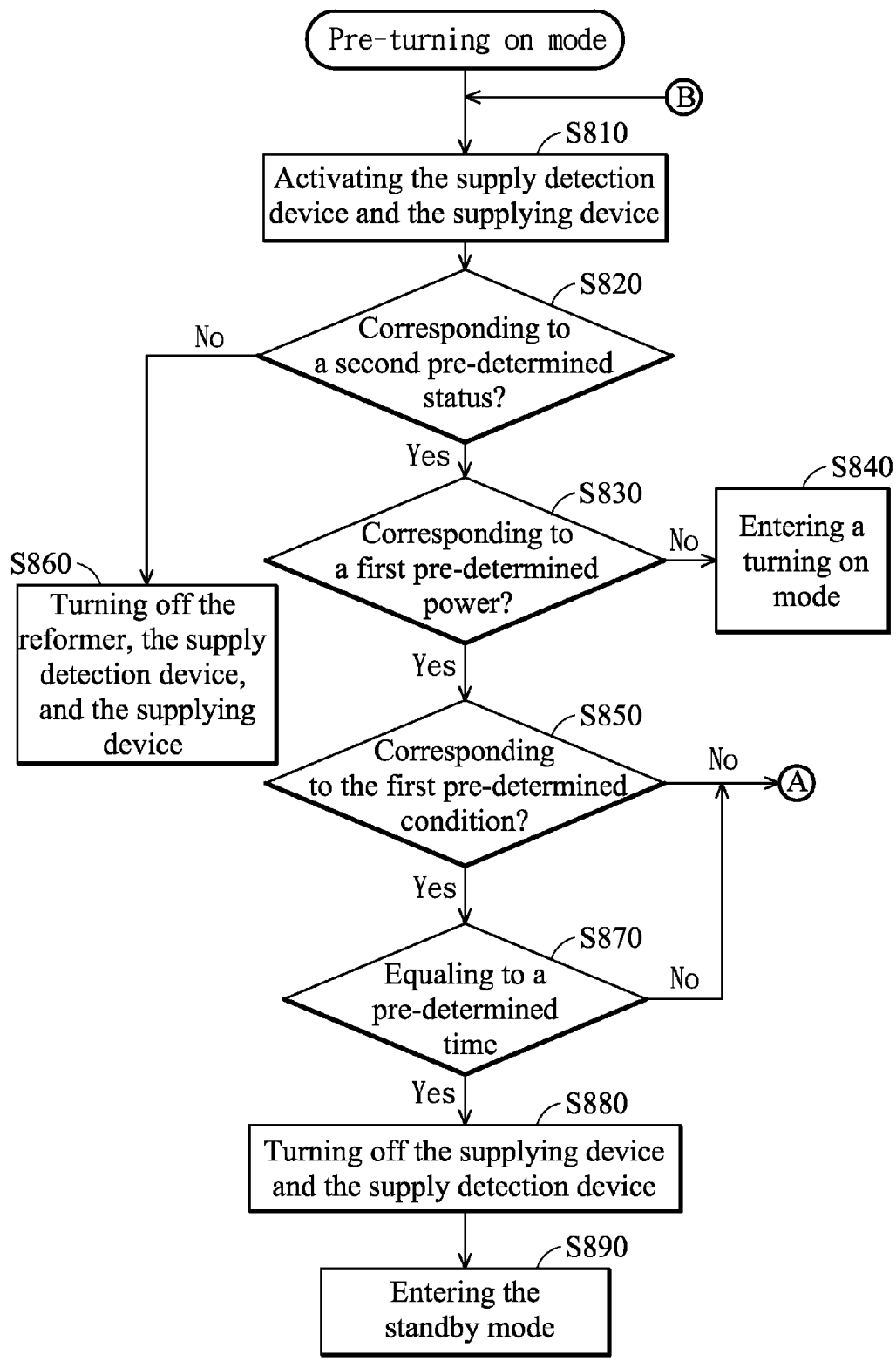
FIG. 8 is a schematic diagram of an exemplary embodiment of the backup power apparatus operating in the pre-turning on mode.

FIG. 8 is a schematic diagram of an exemplary embodiment of the backup power apparatus operating in the pre-turning on mode. When the backup power apparatus operates in the pre-turning on mode, the control unit 124 activates the supply detection device 330 and the supplying device 310 (step S810). In one embodiment, the control unit 124 activates all detection modules of the supply detection device 330 of the fuel cell unit 122 and activates the cooling-water module 311.

The control unit 124 determines whether the recombination status generated by the status-detection device 250 corresponds to the first pre-determined status, and whether the fuel status $ST_{FC}$ generated by the status-detection device 330 corresponds to a second pre-determined status (step S820). When the recombination status does not correspond to the first pre-determined status, or the fuel status $ST_{FC}$ does not correspond to the second pre-determined status, the control unit 124 turns off the reformer 210, the supply detection device 330, and the supplying device 310 (step S860). In one embodiment, the control unit 124 de-activates all activated elements activated by step S810.

When the recombination status corresponds to the first pre-determined status or the fuel status $ST_{FC}$ corresponds to the second pre-determined status, the control unit 124 determines whether a third power stored in the power storage device 430 corresponds to a first pre-determined power (step S830). When the third power does not correspond to the first pre-determined power, the backup power apparatus 120 enters a turning on mode (step S840). When the third power corresponds to the first pre-determined power, the control unit 124 determines whether the city power $V_{AC}$ corresponds to the first pre-determined condition (step S850). When the city power $V_{AC}$ does not correspond to the first pre-determined condition, the control unit 124 executes the recombination confirmed action shown in FIG. 6. When step S670 is executed, if the amount of the hydrogen component does not correspond to the hydrogen condition, step S810 is executed.

In step S850, when the city power $V_{AC}$ corresponds to the first pre-determined condition and the duration time equals a pre-determined time (e.g. 30 sec), the control unit 124 turns off the supplying device 310 and the supply detection device 330 (step S880) and the backup power apparatus 120 enters the standby mode (step S890). When the city power $V_{AC}$ corresponds to the first pre-determined condition and the duration time does not equal the pre-determined time, the control unit 124 executes the recombination confirmed action shown in FIG. 6.

Figure 9A:
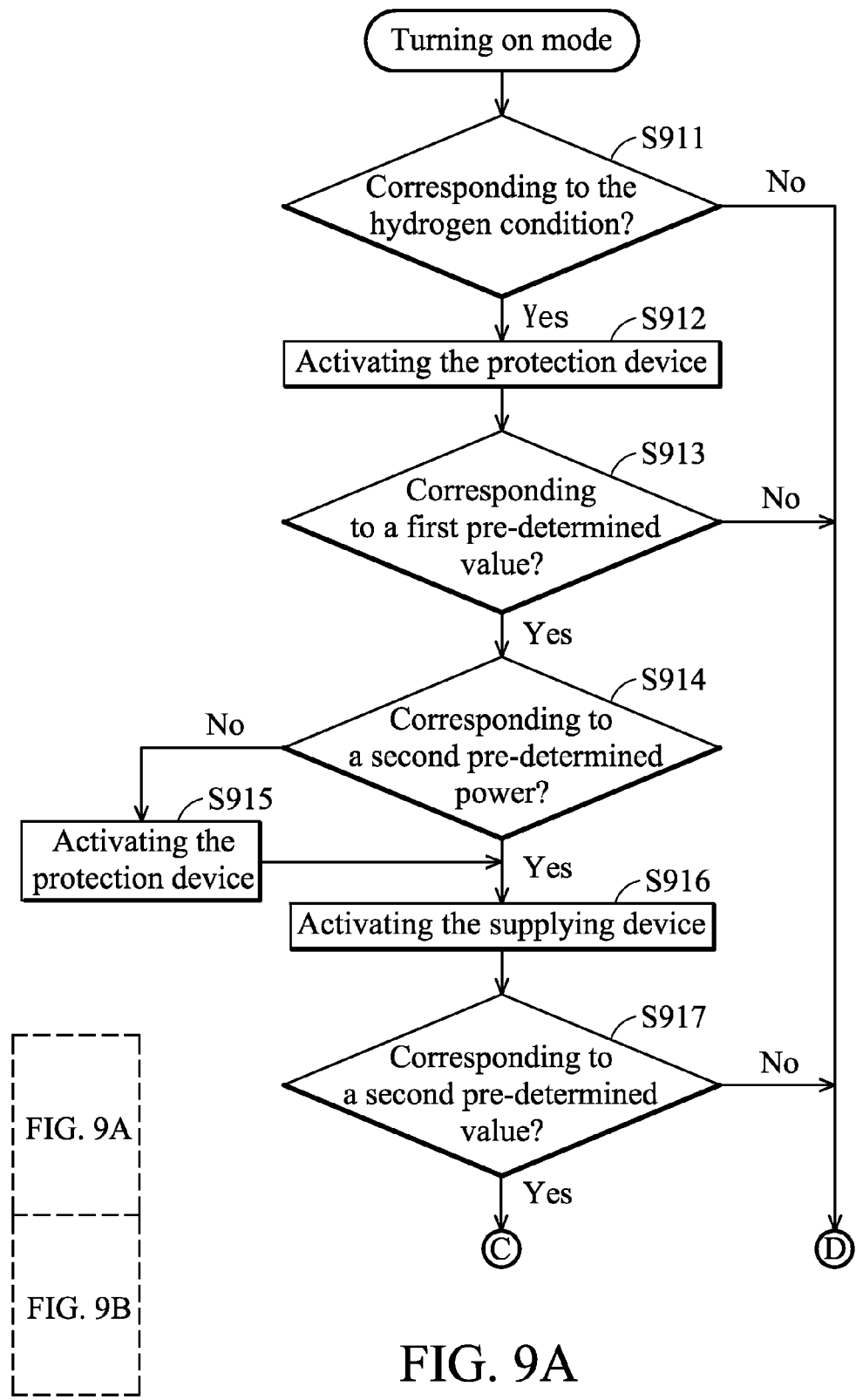
FIGS. 9A and 9B are schematic diagrams of an exemplary embodiment of the backup power apparatus operating in the turning on mode.
Figure 9B:
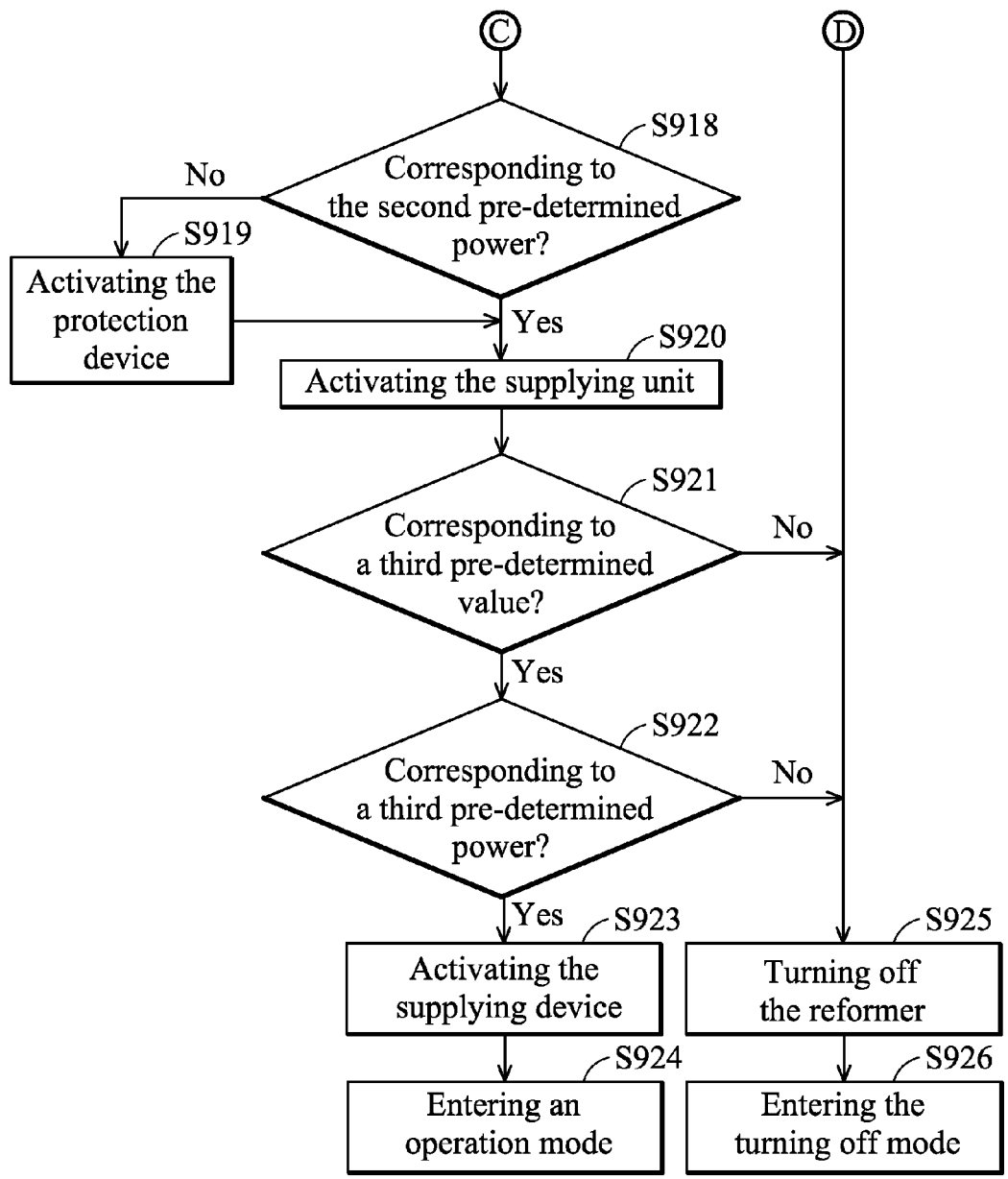

FIGS. 9A and 9B are schematic diagrams of an exemplary embodiment of the backup power apparatus operating in the turning on mode. When the backup power apparatus operates in the turning on mode, the control unit 124 sequentially determines whether the hydrogen input $I_{HY}$, the water input $I_W$, and the air input $I_A$ are sufficient. In one embodiment, the control unit 124 determines whether the supplying device 310 provides enough hydrogen input $I_{HY}$, water input $I_W$ and air input $I_A$ according to the power $V_{FC}$.

When one of the hydrogen input $I_{HY}$, the water input $I_W$ and the air input $I_A$ is not enough, the control unit 124 turns off the reformer 210 and the backup power apparatus 120 enters the turning off mode. However, when the hydrogen input $I_{HY}$, the water input $I_W$ and the air input $I_A$ are enough and the power $V_{FC}$ is normal, the backup power apparatus 120 enters the operation mode.

As shown in FIG. 9, when the backup power apparatus 120 enters the turning on mode, the control unit 124 determines whether the amount of the hydrogen component disposed in the hydrogen storage device 213 corresponds to the hydrogen condition (step S911). In one embodiment, the hydrogen condition in step S911 is a minimum amount of hydrogen. When the amount of the hydrogen component disposed in the hydrogen storage device 213 does not correspond to the hydrogen condition, it means that the reformer 210 is abnormal. Refer to FIG. 9B, the control unit 124 turns off the reformer 210 (step S925) and the backup power apparatus 120 enters the turning off mode (step S926).

Refer to FIG. 9A, when the amount of the hydrogen component disposed in the hydrogen storage device 213 corresponds to the hydrogen condition, the control unit 124 activates the protection device 470 (step S912) and determines whether the water status of the fuel status $ST_{FC}$ corresponds to a first pre-determined value of the second pre-determined status (step S913) to determine whether a cooling-water loop is normal.

When the water status does not correspond to the first pre-determined value, the control unit 124 turns off the reformer 210 (step S925) and the backup power apparatus 120 enters the turning off mode (step S926). When the water status corresponds to the first pre-determined value, the control unit 124 determines whether the power $V_{FC}$ corresponds to a second pre-determined power (step S914). In one embodiment, the control unit 124 determines whether the power $V_{FC}$ is larger than 56.9V in step S914.

When the power $V_{FC}$ does not correspond the second pre-determined power, the control unit 124 activates the protection device 470 again (step S915) and then activates the supplying device 310 (step S916) to provide the hydrogen input $I_{HY}$. When the power $V_{FC}$ corresponds to the second pre-determined power, the control unit 124 activates the supplying device 310 (step S916) to provide the hydrogen input $I_{HY}$.

The control unit 124 determines whether a hydrogen status of the fuel status $ST_{FC}$ corresponds to a second pre-determined value of the second pre-determined status (step S917). When the hydrogen status does not correspond to the second pre-determined value, the control unit 124 turns off the reformer 210 (step S925) and the backup power apparatus 120 enters the turning off mode (step S926). Refer to FIG. 9B, when the hydrogen status corresponds to the second pre-determined value, the control unit 124 determines whether the power $V_{FC}$ corresponds to the second pre-determined power (step S918). When the power $V_{FC}$ does not correspond to the second pre-determined power, the control unit 124 activates the protection device 470 again (step S919) and then activates the supplying unit 310 (step 920) to provide the air input $I_A$. When the power $V_{FC}$ corresponds to the second pre-determined power, the control unit 124 activates the supplying unit 310 (step 920) to provide the air input $I_A$.

The control unit 124 determines whether the air status of the fuel status $ST_{FC}$ corresponds to a third pre-determined value of the second pre-determined status (step S921). When the air status does not correspond to the third pre-determined value, the control unit 124 turns off the reformer 210 (step S925) and the backup power apparatus 120 enters the turning off mode (step S925). When the air status corresponds to the third pre-determined value, the control unit 124 determines whether the power $V_{FC}$ corresponds to a third pre-determined power (step S922) to determine whether the power $V_{FC}$ is normal. When the power $V_{FC}$ does not correspond to the third pre-determined power, the control unit 124 turns off the reformer 210 (step S925) and the backup power apparatus 120 enters the turning off mode (step S926). When the power $V_{FC}$ corresponds to the third pre-determined power, the control unit 124 activates the supplying device 310 (step S923) for adjusting the cooling-water loop and the backup power apparatus 120 enters an operation mode (step S924).

Figure 10A:
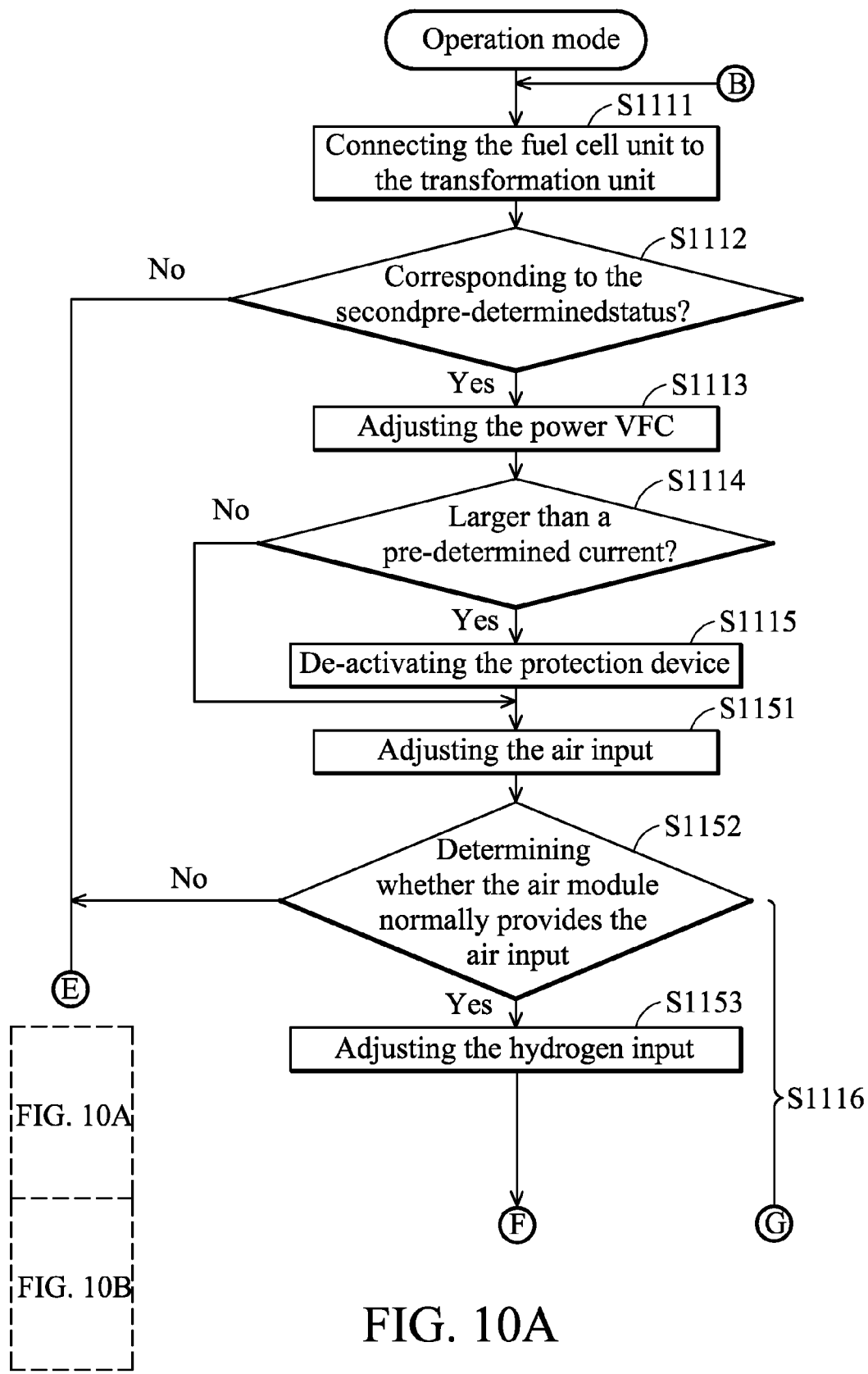
FIGS. 10A and 10B are schematic diagrams of an exemplary embodiment of the backup power apparatus operating in the operation mode.
Figure 10B:
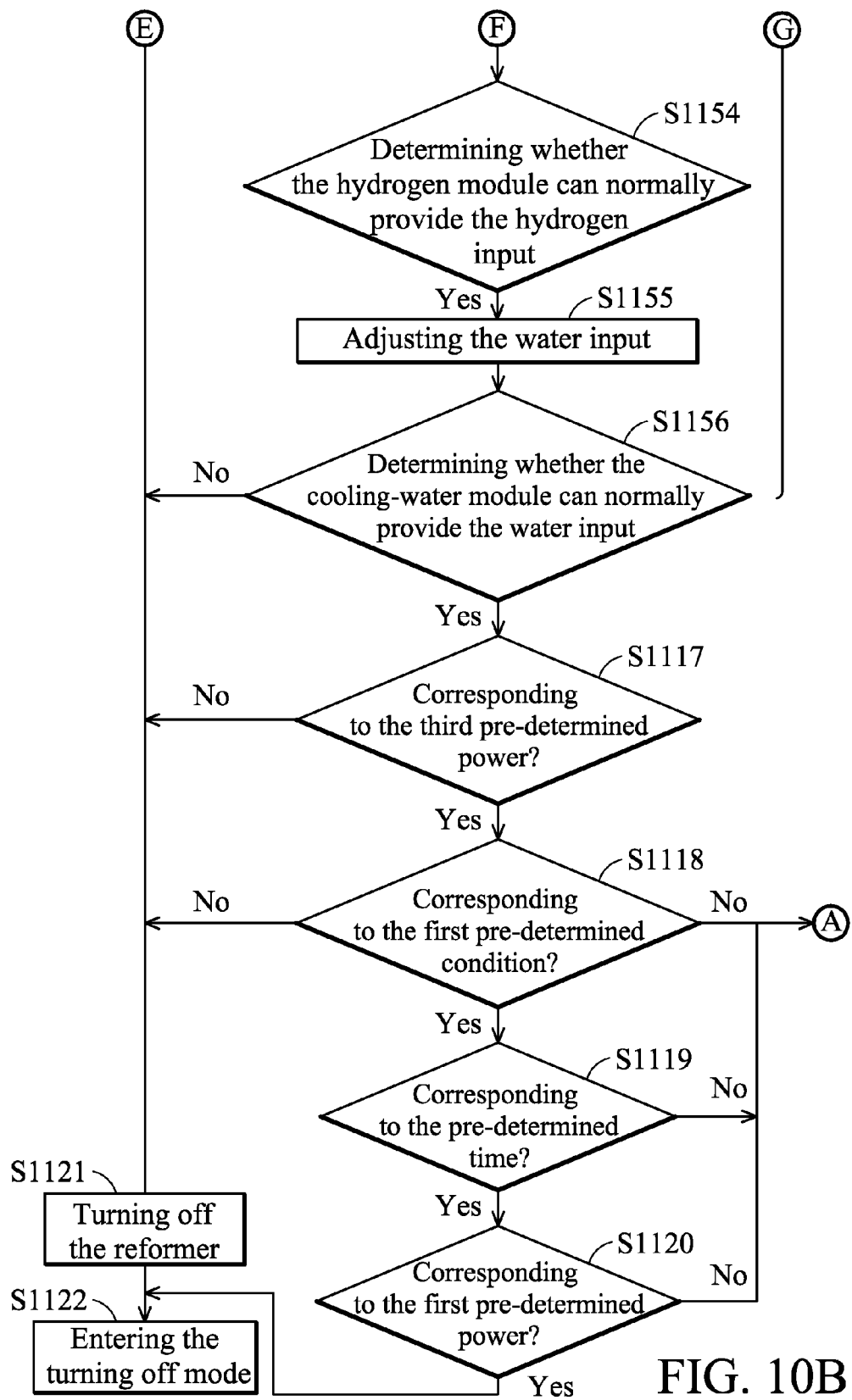

FIGS. 10A and 10B schematic diagrams of an exemplary embodiment of the backup power apparatus operating in the operation mode. When the backup power apparatus 120 operates in the operation mode, the control unit 124 controls the fuel cell unit 122 and the transformation unit 123 to provide appropriate backup power $V_{SUB}$ to the load according to the load status.

In this embodiment, the control unit 124 connects the fuel cell unit 122 to the transformation unit 123 to provide the power $V_{FC}$ to the transformation unit 123 (step S1111). The control unit 124 determines whether the fuel status $ST_{FC}$ corresponds to the second pre-determined status (step S1112). In one embodiment, the control unit 124 determines whether the hydrogen concentration is appropriate for the case 300 according to the fuel status $ST_{FC}$.

Refer to FIG. 10B, when the fuel status $ST_{FC}$ does not correspond to the second pre-determined status, the control unit 124 turns off the reformer 210 (step S1121) and the backup power apparatus 120 enters the turning off mode (step S1122). Refer to FIG. 10A, when the fuel status $ST_{FC}$ corresponds to the second pre-determined status, the transformation unit 123 controls the fuel cell unit 123 to adjust the power $V_{FC}$ according to the load 20 (step S1113). In one embodiment, when the load 20 requires a large current, the transformation unit 123 collects a large current from the fuel cell unit 123.

The control unit 124 determines whether an output current of the fuel cell unit 122 is larger than a pre-determined current (step S1114). In one embodiment, the pre-determined current is 10A. When the output current of the fuel cell unit 122 is larger than the pre-determined current, the control unit 124 de-activates the protection device 470 (step S1115), controls the supplying device 310 to adjust at least one of the hydrogen input $I_{HY}$, the water input $I_W$, and the air input $I_A$ according to the load 20 and determines whether the fuel status $ST_{FC}$ generated by the status-detection device 330 corresponds to the second pre-determined status (step S1116).

When the output current of the fuel cell unit 122 is not higher than the pre-determined current, the control unit 124 activates the supplying device 310 and the supply detection device 330 and determines whether the fuel status $ST_{FC}$ corresponds to the second pre-determined status (step S1116). In one embodiment, the control unit 124 determines whether the water status of the fuel status $ST_{FC}$ corresponds to the first pre-determined value, whether the air status of the fuel status $ST_{FC}$ corresponds to the second pre-determined value, and whether the hydrogen status of the fuel status $ST_{FC}$ corresponds to the third pre-determined value. When the water status does not correspond to the first pre-determined value, the air status does not correspond to the second pre-determined value, or the hydrogen status does not correspond to the third pre-determined value, the control unit 124 turns off the reformer 210 and the backup power apparatus 120 enters the turning off mode.

In this embodiment, the control unit 124 controls the air module 315 to adjust the air input $I_A$ according to the status of the load (step S1151). The control unit 124 activates the supply detection device 330 to generate the fuel status $ST_{FC}$. The control unit 124 determines whether the air module 315 normally provides the air input $I_A$ according to the fuel status $ST_{FC}$ generated by the supply detection device 330 (step S1152). When the air module 315 cannot normally provide the air input $I_A$, steps S1121 and S1122 are executed. When the air module 315 can normally provide the air input $I_A$, the control unit 124 controls the hydrogen module 313 to adjust the hydrogen input $I_{HY}$ according to the status of the load 20 (step S1153). Refer to FIG. 10B, the control unit 124 determines whether the hydrogen module 313 can normally provide the hydrogen input $I_{HY}$ according to the fuel status $ST_{FC}$ generated by the supply detection device 330 (step S1154). When the hydrogen module 313 cannot normally provide the hydrogen input $I_{HY}$, steps S1121 and S1122 are executed. When the hydrogen module 313 can normally provide the hydrogen input $I_{HY}$, the control unit 124 controls the cooling-water module 311 to adjust the water input $I_W$ according to the status of the load (step S1155). The control unit 124 determines whether the cooling-water module 311 can normally provide the water input $I_W$ according to the fuel status $ST_{FC}$ generated by the supply detection device 330 (step S1156). When the cooling-water module 311 cannot normally provide the water input $I_W$, steps S1121 and S1122 are executed. When the cooling-water module 311 can normally provide the water input $I_W$, the control unit 124 determines whether the power $V_{FC}$ corresponds to the third pre-determined power (step S1117).

When the power $V_{FC}$ does not correspond to the third pre-determined power, it means that the fuel cell unit 122 is abnormal, and thus the control unit 124 turns off the reformer 210 (step S1121) and the backup power apparatus 120 enters the turning off mode (step S1122). When the power $V_{FC}$ corresponds to the third pre-determined power, it represents the fuel cell unit 122 being ready. The control unit 124 determines whether the city power $V_{AC}$ corresponds to the first pre-determined condition again (step S1118) to determine whether the city power $V_{AC}$ is stable.

When the city power $V_{AC}$ does not correspond to the first pre-determined condition, the control unit 124 executes the recombination confirmed action shown in FIG. 6. When the city power $V_{AC}$ corresponds to the first pre-determined condition, the control unit 124 determines whether the duration time that the city power $V_{AC}$ corresponds to the first pre-determined condition corresponds a pre-determined time (step S1119). When the duration time does not correspond to the pre-determined time, the control unit 124 executes the recombination confirmed action shown in FIG. 6. When the duration time corresponds to the pre-determined time, the control unit 124 determines whether the power stored in the power storage device 430 corresponds to the first pre-determined power (step S1120).

When the power stored in the power storage device 430 corresponds to the first pre-determined power, the backup power apparatus 120 enters the turning off mode (step S1122). When the power stored in the power storage device 430 does not correspond to the first pre-determined power, the control unit 124 executes the recombination confirmed action shown in FIG. 6.

Figure 11A:
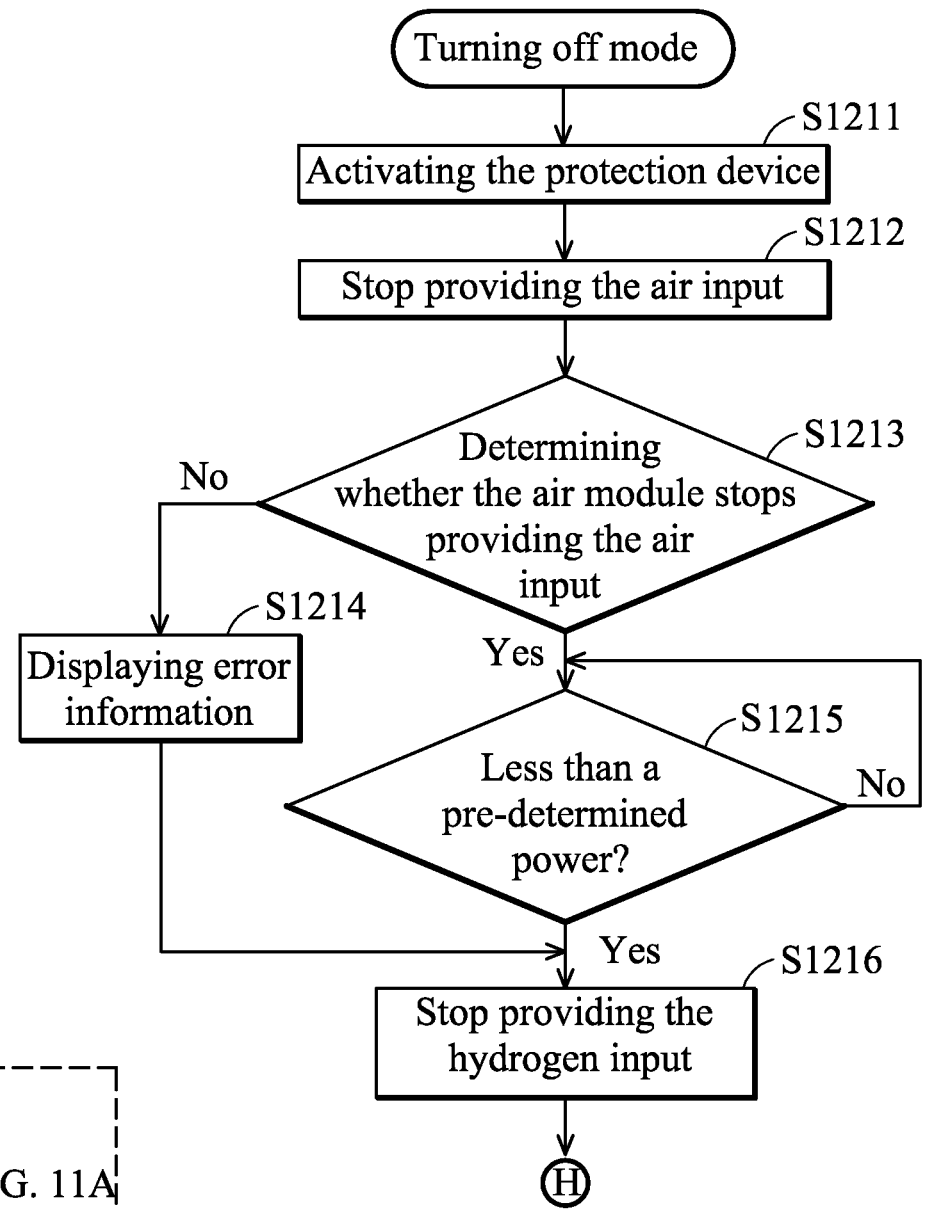
FIGS. 11A and 11B are schematic diagrams of an exemplary embodiment of the backup power apparatus operating in the turning off mode.
Figure 11B:
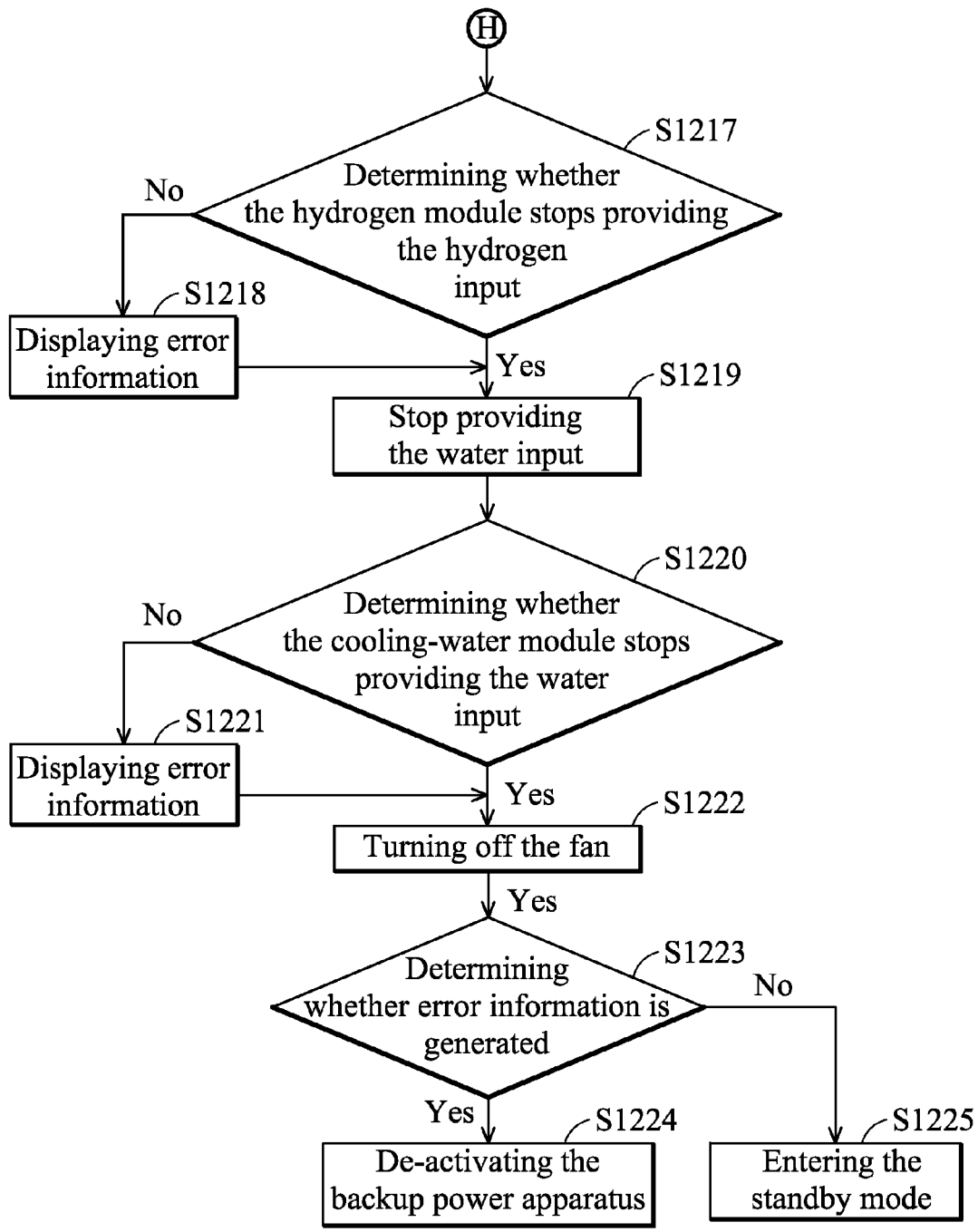

FIGS. 11A and 11B schematic diagrams of an exemplary embodiment of the backup power apparatus operating in the turning off mode. When the backup power apparatus operates in the turning off mode, the control unit 124 turns off the supplying device 310 to stop providing the hydrogen input $I_{HY}$, the water input $I_W$, and the air input $I_A$ to the cell stack 350. The invention does not limit the sequence of stopping the provision of the hydrogen input $I_{HY}$, the water input $I_W$, and the air input $I_A$. In this embodiment, the supplying device 310 first stops providing the air input $I_A$ and then stops providing the hydrogen input $I_{HY}$ and finally stops providing the water input $I_W$.

Refer to FIG. 11, when the backup power apparatus 120 operates in the turning off mode, the control unit 124 activates the protection device 470 (step S1211) and turns off the air module 315 to stop providing the air input $I_A$ (step S1212). The control unit 124 determines whether the air module 315 stops providing the air input $I_A$ (step S1213).

When the air module 315 does not stop providing the air input $I_A$, error information is displayed (step S1214). In one embodiment, the control unit 124 notifies the remote user of the error information via the remote unit 125 or displays the error information in a display device (not shown).

When the air module 315 stops providing the air input $I_A$, the control unit 124 determines whether the power $V_{FC}$ is less than a pre-determined power (step S1215). In this embodiment, the pre-determined power is 6V.

When the power $V_{FC}$ is not less than the pre-determined power, step S1215 is executed until the power $V_{FC}$ is less than the pre-determined power. When the power $V_{FC}$ is less than the pre-determined power, the control unit 124 turns off the hydrogen module 313 to stop providing the hydrogen input $I_{HY}$ (step S1216). Refer to FIG. 11B, the control unit 124 determines whether the hydrogen module 313 stops providing the hydrogen input $I_{HY}$ (step S1217). When the hydrogen module 313 does not stop providing the hydrogen input $I_{HY}$, error information is displayed (step S1218). When the hydrogen module 313 stops providing the hydrogen input $I_{HY}$, the control unit 124 turns off the cooling-water module 311 to stop providing the water input $I_W$ (step S1219). The control unit 124 determines whether the cooling-water module 311 stops providing the water input $I_W$ (step S1220). When the cooling-water module 311 does not stop providing the water input $I_W$, error information is displayed (step S1221). When the cooling-water module 311 stops providing the water input $I_W$, the control unit 124 turns off the supply detection device 330 and the fan in the case 300 (step S1222).

The control unit 124 determines whether error information is generated (step S1223). When the error information is generated, the control unit 124 de-activates the backup power apparatus 120 such that the backup power apparatus 120 stops providing the backup power, or the backup power apparatus 120 cannot be activated (step S1224). In one embodiment, after providing operating power to the backup power apparatus 120, the backup power apparatus 120 can be activated. When no error information is generated, the backup power apparatus 120 enters the standby mode (step S1225).

In summary, when the city power does not correspond to a pre-determined condition, it means that the city power is unstable. Thus, the backup power apparatus provides power to the load. Since the backup power apparatus utilizes the fuel cell to provide the power, it is determined whether a hydrogen component, an air component and a water component required by the fuel cell are sufficient such that the fuel cell unit can provide power immediately.

When the backup power apparatus operates in the different modes, the different determinant steps and the control step are executed. Thus, when the city power is unstable, the backup power apparatus can immediately provide power to drive the load. The above determinant step and the above control steps are repeatedly executed and the invention does not limit the sequence of the above determinant step or the above control steps. Furthermore, an error can immediately be found according to the different confirmed steps executed by the control unit. A user can immediately execute the corresponding processes to eliminate the error.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power supply system for driving a load, comprising:
   a main power apparatus providing a main power to the load according to a city power; and
   a backup power apparatus providing a backup power to the load when the city power does not correspond to a first pre-determined condition and comprising:
      a recombination unit disposed in a case and comprising:
         a reformer combining a methanol component to generate a hydrogen component, wherein the methanol component is disposed in a methanol tub and the hydrogen component is disposed in a hydrogen tub;
      a fuel cell unit comprising:
         a supplying device generating a hydrogen input, a water input and an air input according to the hydrogen component, a water component, and an air component; and
         a cell stack generating a first power according to the hydrogen input, the water input and the air input;
      a transformation unit detecting the city power and transforming the first power to generate the backup power; and
      a control unit activating the reformer, the supplying device and the transformation unit to generate the backup power when the city power does not correspond to the first pre-determined condition, wherein when the city power corresponds to the first pre-determined condition, the control unit controls the recombination unit to make the hydrogen component disposed in the hydrogen tub correspond to the hydrogen condition.

2. The power supply system as claimed in claim 1, wherein the recombination unit further comprises:
   a status-detection device detecting the recombination unit to generate a recombining status and an operational status; and
   a status-control device controlling the reformer according to the recombining status and the operational status,
   wherein when the backup power apparatus operates in a standby mode, a pre-turning on mode, and an operation mode, the control unit executes a recombination confirmed action, and during execution of the recombination confirmed action, the control unit determines whether the reformer is activated,
   wherein when the reformer is activated, the control unit determines whether the operational status corresponds to a second pre-determined condition, and when the operational status does not correspond to the second pre-determined condition, the control unit turns off the reformer, but when the operational status corresponds to the second pre-determined condition, the control unit determines whether the hydrogen component disposed in the hydrogen tub corresponds to the hydrogen condition, when the hydrogen component disposed in the hydrogen tub corresponds to the hydrogen condition, the control unit turns off the reformer, wherein when the reformer is de-activated, the control unit determines whether the hydrogen component disposed in the hydrogen tub corresponds to the hydrogen condition, when the hydrogen component disposed in the hydrogen tub corresponds to the hydrogen condition, the control unit controls the status-control device according to the recombination status, when the hydrogen component disposed in the hydrogen tub does not correspond to the hydrogen condition, the control unit determines whether the operational status corresponds to the second pre-determined condition, when the operational status does not correspond to the second pre-determined condition, the control unit turns off the reformer, and when the operational status corresponds to the second pre-determined condition, the control unit activates the reformer and determines whether the operational status corresponds to the second pre-determined condition again, when the operational status does not correspond to the second pre-determined condition, the control unit turns off the reformer, and when the operational status still corresponds to the second pre-determined condition, the control unit determines whether the hydrogen component disposed in the hydrogen tub corresponds to the hydrogen condition, when the hydrogen component disposed in the hydrogen tub corresponds to the hydrogen condition, the control unit turns off the reformer.

3. The power supply system as claimed in claim 2, wherein when the backup power apparatus operates in the standby mode and the city power does not correspond to the first pre-determined condition, the backup power apparatus enters the pre-turning on mode, when the backup power apparatus operates in the standby mode and the city power corresponds to the first pre-determined condition, the control unit controls an internal temperature of the backup power apparatus and determines whether the recombination status corresponds to a first pre-determined status, when the recombination status does not correspond to the first pre-determined status, the control unit turns off the reformer, and when the recombination status corresponds to a first pre-determined status, the control unit executes the recombination confirmed action.

4. The power supply system as claimed in claim 3, wherein the fuel cell unit further comprises:
   a supply detection device detecting the hydrogen input, the water input and the air input to determine a fuel status,
   wherein when the backup power apparatus operates in the pre-turning on mode, the control unit activates the supply detection device and the supplying device and determines whether the recombination status corresponds to the first pre-determined status and the fuel status corresponds to a second pre-determined status,
   when the recombination status does not correspond to the first pre-determined status or the fuel status does not correspond to the second pre-determined status, the control unit turns off the reformer, the supply detection device, and the supplying device.

5. The power supply system as claimed in claim 4, wherein the transformation unit further comprises:
   a power storage device storing a third power,
   wherein when the recombination status corresponds to the first pre-determined status and the fuel status corresponds to the second pre-determined status, the control unit determines whether the third power corresponds to a first pre-determined power, when the third power does not correspond to the first pre-determined power, the backup power apparatus enters a turning on mode, when the third power corresponds to the first pre-determined power and the city power does not correspond to the first pre-determined condition, the control unit executes the recombination confirmed action,
   when the third power corresponds to the first pre-determined power and the city power corresponds to the first pre-determined condition, the control unit turns off the supplying device and the supply detection device and the backup power apparatus enters the standby mode.

6. The power supply system as claimed in claim 5, wherein the transformation unit further comprises:
   a protection device adjusting the first power;
   wherein when the backup power apparatus operates in the turning on mode, the control unit determines whether the hydrogen component disposed in the hydrogen tub corresponds to the hydrogen condition, when the hydrogen component disposed in the hydrogen tub does not correspond to the hydrogen condition, the control unit turns off the reformer and the backup power apparatus enters a turning off mode, and when the hydrogen component disposed in the hydrogen tub corresponds to the hydrogen condition, the control unit activates the protection device and determines whether a water status of the fuel status corresponds to a first pre-determined value of the second pre-determined status, when the water status does not correspond to the first pre-determined value, the control unit turns off the reformer and the backup power apparatus enters the turning off mode, when the water status corresponds to the first pre-determined value, the control unit determines whether the first power is less than a second pre-determined power,
   when the first power is not less than the second pre-determined power, the control unit activates the protection device again and activates the supplying device to provide the hydrogen input, when the first power is less than a second pre-determined power, the control unit activates the supplying device to provide the hydrogen input,
   after the supplying device provides the hydrogen input, the control unit again determines whether a hydrogen status of the fuel status corresponds to a second pre-determined value of the second pre-determined status,
   when the hydrogen status does not correspond to the second pre-determined value, the control unit turns off the reformer and the backup power apparatus enters the turning off mode, when the hydrogen status corresponds to the second pre-determined value, the control unit determines whether the first power is less than the second pre-determined power, when the first power is not less than the second pre-determined power, the control unit again activates the protection device and activates the supplying device to provide the air input, when the first power is less than the second pre-determined power, the control unit activates the supplying device to provide the air input,
   after the supplying device provides the air input, the control unit determines whether an air status of the fuel status corresponds to a third pre-determined value of the second pre-determined status,
   when the air status does not correspond to the third pre-determined value, the control unit turns off the reformer and the backup power apparatus enters the turning off mode, when the air status corresponds to the third pre-determined value, the control unit determines whether the first power corresponds to a third pre-determined power, when the first power does not correspond to the third pre-determined power, the control unit turns off the reformer and the backup power apparatus enters the turning off mode, when the first power corresponds to the third pre-determined power, the control unit activates the supplying device to adjust a cooling-water loop and the backup power apparatus enters an operation mode.

7. The power supply system as claimed in claim 6, wherein during the operation mode, the fuel cell unit is coupled to the transformation unit to provide the first power to the transformation unit, wherein the control unit determines whether the fuel status corresponds to the second pre-determined status, when the fuel status does not correspond to the second pre-determined status, the control unit turns off the reformer and the backup power apparatus enters the turning off mode, when the fuel status corresponds to the second pre-determined status, the transformation unit adjusts the first power according to the load, wherein when an output current of the fuel cell unit is larger than a pre-determined current, the control unit de-activates the protection device, controls the supplying device to adjust at least one of the hydrogen input, the water input, and the air input according to the load, and determines whether the fuel status generated by the supply detection device corresponds to the second pre-determined status, when the output current is not larger than the pre-determined current, the control unit controls the supplying device according to the load and determines whether the fuel status corresponds to the second pre-determined status, wherein when the fuel status does not correspond to the second pre-determined status, the control unit turns off the reformer and the backup power apparatus enters the turning off mode, when the fuel status corresponds to the second pre-determined status, the control unit determines whether the first power corresponds to the third pre-determined power, wherein when the first power does not correspond to the third pre-determined power, the control unit turns off the reformer and the backup power apparatus enters the turning off mode, when the first power corresponds to the third pre-determined power and the city power corresponds to the first pre-determined condition, the control unit determines whether the third power corresponds to the first pre-determined power, and when the third power corresponds to the first pre-determined power, the backup power apparatus enters the turning off mode, and wherein when the city power does not correspond to the first pre-determined condition or the third power does not correspond to the first pre-determined power, the control unit executes the recombination confirmed action.

8. The power supply system as claimed in claim 7, wherein when the control unit controls the supplying device to adjust at least one of the hydrogen input, the water input, and the air input according to the load, the control unit activates the supply detection device to determine whether the water status corresponds to the first pre-determined value, whether the hydrogen status corresponds to the second pre-determined value and whether the air status corresponds to the third pre-determined value, wherein when the water status does not correspond to the first pre-determined value, the hydrogen status does not correspond to the second pre-determined value, or the air status does not correspond to the third pre-determined value, the control unit turns off the reformer and the backup power apparatus enters the turning off mode.

9. The power supply system as claimed in claim 8, wherein when the backup power apparatus operates in the turning off mode, the control unit activates the protection device and de-activates the supplying device to stop providing the hydrogen input, the water component and the air input and the backup power apparatus enters the standby mode.

10. The power supply system as claimed in claim 2, wherein the control unit directs the status-control device to control at least one of an operation of a fan disposed in the case, a hydrogen concentration of the case, and a temperature status of the case according to the recombination status, and the operation condition relates to at least one of a temperature of the case, an amount of the methanol component disposed in the methanol tub, and an amount of the hydrogen component disposed in the hydrogen storage device.

* * * * *